US012573644B2

(12) United States Patent
Sakaray et al.

(10) Patent No.: US 12,573,644 B2
(45) Date of Patent: Mar. 10, 2026

(54) HYDROGEN FUEL CELL COOLING

(71) Applicant: Caterpillar Inc., Peoria, IL (US)

(72) Inventors: Umakanth Sakaray, Dunlap, IL (US);
Zachary Kroehler, Peoria, IL (US);
Pavan Kumar Reddy Kudumula,
Dunlap, IL (US)

(73) Assignee: Caterpillar Inc., Peoria, IL (US)

( * ) Notice: Subject to any disclaimer, the term of this
patent is extended or adjusted under 35
U.S.C. 154(b) by 519 days.

(21) Appl. No.: 18/299,940

(22) Filed: Apr. 13, 2023

(65) Prior Publication Data

US 2024/0347742 A1     Oct. 17, 2024

(51) Int. Cl.
H01M 8/04          (2016.01)
H01M 8/04007     (2016.01)
(Continued)

(52) U.S. Cl.
CPC ...  H01M 8/04029 (2013.01); H01M 8/04014
(2013.01); H01M 8/04067 (2013.01); **H01M
8/04216 (2013.01); H01M 8/04358** (2013.01);
H01M 8/04731 (2013.01); H01M 8/04768
(2013.01); H01M 8/0606 (2013.01)

(58) Field of Classification Search
CPC .................. F28D 5/02; F17C 2221/012; F17C
2223/013; F17C 2225/0123; F17C
2227/0135; F17C 2227/0313; F17C
2227/0393; F17C 2250/0439; F17C
2250/0631; F17C 2260/023; F17C
2270/0184; F17C 2270/0763; F17C 7/00;

F17C 9/02; H01M 8/04014; H01M
8/04029; H01M 8/04059; H01M 8/04067;
H01M 8/04164; H01M 8/04216;
(Continued)

(56) References Cited

U.S. PATENT DOCUMENTS 7,926,403 B1 *   4/2011  Vigil ........................ F41A 1/04
                                                                        102/440
8,124,290 B2      2/2012  Saito et al.
(Continued)

FOREIGN PATENT DOCUMENTS

CN            111525153 A      8/2020
CN            114300709 A      4/2022
(Continued)

OTHER PUBLICATIONS

Written Opinion and International Search Report for Int'l. Patent
Appln. No. PCT/US2024/018309, mailed Jun. 21, 2024 (15 pgs).

*Primary Examiner* — Filip Zec
(74) *Attorney, Agent, or Firm* — Bookoff McAndrews
PLLC

(57)          ABSTRACT

A system for vaporizing hydrogen for providing hydrogen in
gaseous form to a plurality of hydrogen fuel cells includes:
a vaporizer; a radiator configured to cool a cooling fluid in
a coolant system of the plurality of hydrogen fuel cells; a
spray supply system comprising: a tank; a pump configured
to pump water from the tank; a nozzle system; and a
condensate tray configured to collect condensate and return
the condensate to the tank. The system is configured to
activate the pump to pump the condensate collected in the
tank to cool the radiator based on a temperature of the
cooling fluid.

20 Claims, 6 Drawing Sheets

(51) Int. Cl.
*H01M 8/04014* (2016.01)
*H01M 8/04029* (2016.01)
*H01M 8/04082* (2016.01)
*H01M 8/0432* (2016.01)
*H01M 8/04701* (2016.01)
*H01M 8/04746* (2016.01)
*H01M 8/0606* (2016.01)

(58) Field of Classification Search
CPC ......... H01M 8/04358; H01M 8/04731; H01M 8/04768; H01M 8/0606
See application file for complete search history.

(56) References Cited

U.S. PATENT DOCUMENTS

| | | | | |
|---|---|---|---|---|
| 9,383,063 | B2 * | 7/2016 | Gupta | ........................ F17C 7/04 |
| 10,400,712 | B2 * | 9/2019 | Garner | .................... F17C 13/02 |
| 10,411,275 | B2 | 9/2019 | Kwon et al. | |
| 10,930,944 | B2 | 2/2021 | Kwon | |
| 11,009,185 | B2 * | 5/2021 | Li | .............................. F17C 7/04 |
| 11,079,071 | B2 * | 8/2021 | Nagura | ................... F17C 13/04 |
| 11,480,301 | B2 * | 10/2022 | Beuneken | ................. F17C 5/02 |
| 12,294,128 | B2 * | 5/2025 | Montgomery | .... H01M 8/04925 |
| 2012/0159970 | A1 * | 6/2012 | Reese | ..................... F17C 5/007 |
| | | | | 62/53.2 |
| 2014/0290790 | A1 * | 10/2014 | Mathison | ............... F17C 5/007 |
| | | | | 141/94 |
| 2016/0146401 | A1 * | 5/2016 | Leachman | ............. F17C 5/007 |
| | | | | 141/35 |
| 2018/0346313 | A1 * | 12/2018 | Feng | ........................ F17C 9/02 |
| 2020/0067115 | A1 | 2/2020 | Wakatsuki et al. | |

FOREIGN PATENT DOCUMENTS

| | | |
|---|---|---|
| DE | 102021103449 A1 | 8/2022 |
| EP | 1700026 B1 | 1/2021 |
| JP | 2002313383 A | 10/2002 |
| JP | 2002372385 A | 12/2002 |
| JP | 4839514 B2 | 12/2011 |
| KR | 102374959 B1 | 3/2022 |

* cited by examiner

HYDROGEN FUEL CELL COOLING

TECHNICAL FIELD

The present disclosure relates generally to cooling hydrogen fuel cells, and more particularly, to cooling hydrogen fuel cells using liquid hydrogen.

BACKGROUND

A fuel cell (e.g., a proton exchange membrane fuel cell (PEMFC)) uses chemical energy, generally from hydrogen, to produce clean and efficient electrical energy. With hydrogen as a working fuel, the fuel cell will produce only electricity, water, and heat. Fuel cells are thus beneficial in a wide range of applications by providing electrical power. They can be used to power large utility power stations, server farms, and large industrial equipment as well as small applications, such as, for example, personal computers.

In a fuel-cell-based power system, heat released from the fuel cells may be absorbed by a coolant system designed to cool the fuel cells. This heat release can account for more than half of all the chemical energy produced by the fuel cells. For optimal performance, a stack of fuel cells may require significant cooling to achieve optimal operating temperatures in the range of 60-65 degrees Celsius. Cooling to this level can present a significant challenge, especially in environments in which equipment must be cooled from an ambient temperatures as high as 50 degrees Celsius.

Still, even in environments with high ambient temperatures, systems for cooling fuel cell stacks may take advantage of some environmental conditions. For example, cooling systems may use ambient temperatures and humidity along with waste heat to vaporize liquid hydrogen, a necessary component for the fuel cell reaction, and may use such vaporization to condense and recapture liquid in the air in order to cool the fuel cell stack.

Japanese Patent Document JP 4839514 B2 ("the '514 reference") describes fuel cells used to generate electric power by chemically reacting hydrogen and oxygen. The fuel cells are cooled by a system including a heat medium flow path disposed outside the fuel cell, which flow path circulates a cooling medium in the fuel cell. The system further includes a radiator that is interposed in the heat medium flow path to dissipate heat of the cooling medium to the atmosphere to cool the cooling medium, and a fan that blows air to the radiator. The system further includes a gas-liquid separator that is disposed outside the fuel cell, in which water and water vapor generated by the chemical reaction inside the fuel cell are introduced. In the disclosure, water vapor is separated and water is stored and later sprayed into the blown air sent to the radiator through the spraying passage by operation of a water pump. However, the '514 reference does not disclose a fuel cell cooling system in which liquid hydrogen is heated using vaporizers that convert the liquid hydrogen to gaseous hydrogen that can then be utilized by hydrogen fuel cells, the vaporizers being integrated with a stacked radiator to facilitate evaporative cooling using an ambient humidity as moisture for cooling the stacked radiator.

The system of the present disclosure may solve one or more of the problems set forth above and/or other problems in the art. The scope of the current disclosure, however, is defined by the attached claims, and not by the ability to solve any specific problem.

SUMMARY

In one aspect, a system for vaporizing hydrogen for providing hydrogen in gaseous form to a plurality of hydrogen fuel cells includes: a vaporizer; a radiator configured to cool a cooling fluid in a coolant system of the plurality of hydrogen fuel cells; a spray supply system comprising: a tank; a pump configured to pump water from the tank; a nozzle system; and a condensate tray configured to collect condensate and return the condensate to the tank. The system is configured to activate the pump to pump the condensate collected in the tank to cool the radiator based on a temperature of the cooling fluid.

In another aspect, a system for cooling of a radiator of a hydrogen fuel cell stack includes: a vaporizer; a radiator configured to cool a cooling fluid in a coolant system of the hydrogen fuel cell stack; a spray supply system including: a tank; a pump configured to pump water from the tank; a nozzle system; and a condensate tray configured to collect condensate and return the condensate to the tank; and a controller, the controller comprising a processor and a memory storing one or more processor readable instructions. The instructions cause the system to: activate the pump to spray the condensate collected in the tank to cool the radiator based on a temperature of the cooling fluid.

In yet another aspect, a method of cooling of a fuel cell stack radiator includes measuring an ambient temperature and determining a temperature difference between the ambient temperature and a stored temperature value; measuring a temperature of a cooling fluid at an outlet of a radiator of a fuel cell stack; activating a pump to provide condensate spray through a nozzle system based on the measured temperature being above a threshold value. The pump is configured to pump liquid from a tank that has been collected as condensate from a vaporizer configured to evaporate liquid hydrogen to provide hydrogen gas to the fuel cell stack.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
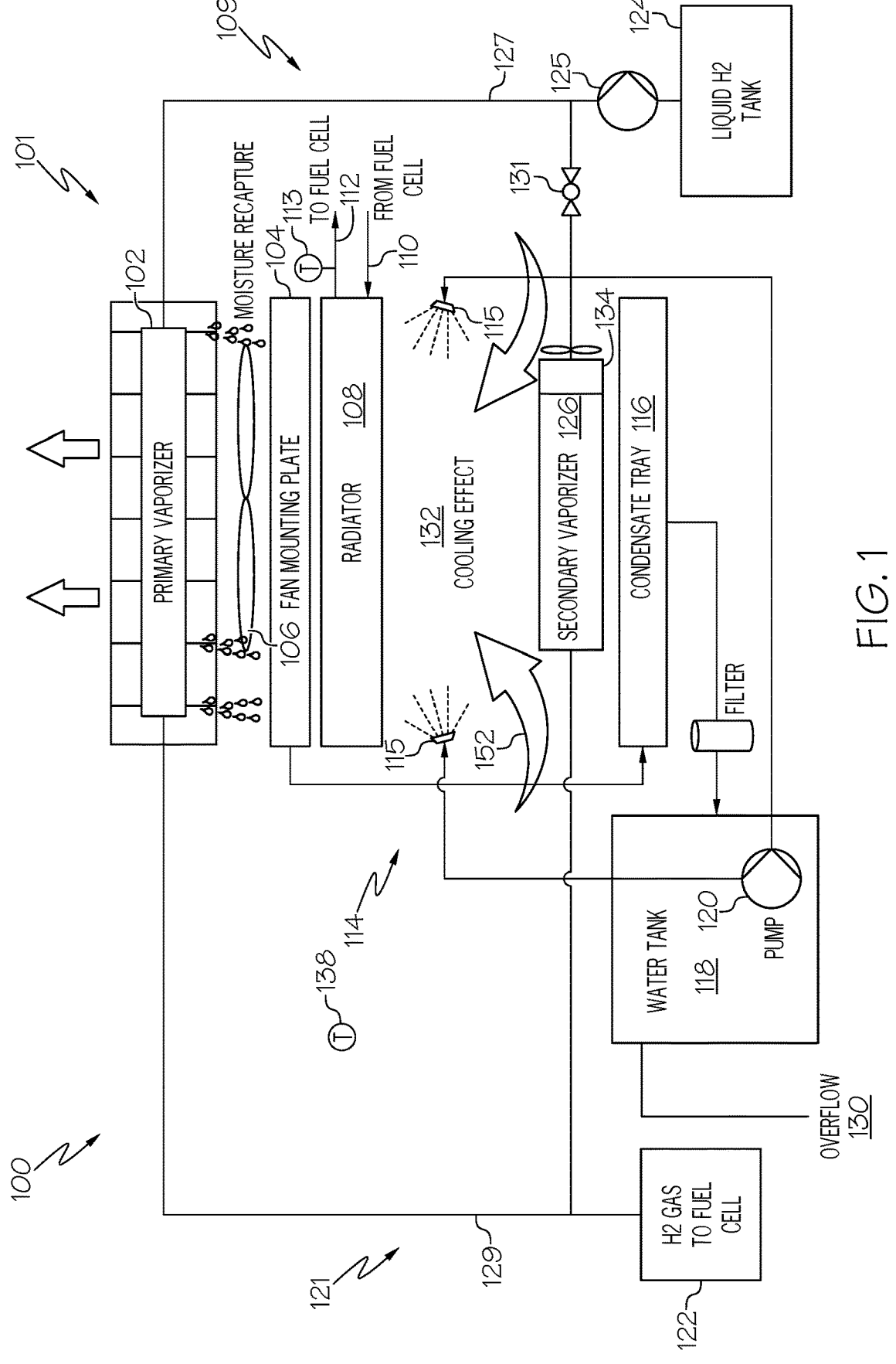
FIG. 1 is a schematic drawing of a system for hydrogen fuel cell cooling, according to aspects of the disclosure.

Referring to FIG. 1, a system 100 includes a vaporization circuit 101 that may include a primary vaporizer 102, a secondary vaporizer 126, a fan mounting plate 104 for mounting at least one fan 106, a fan system 134 for providing forced air over the secondary vaporizer 126, and a radiator 108. The radiator may receive a second fluid from a hydrogen fuel cell cooling system 109 having a fuel cell return 110 and a fuel cell supply 112, which line may be configured with a supply side temperature sensor 113. The system 100 may also include a spray supply system 114 that may include multiple spray nozzles 115, a condensate tray 116 for collecting condensate condensed by the primary vaporizer 102, a water tank 118, which may include an overflow 130, and a water pump 120. A hydrogen supply system 121 may include a liquid hydrogen supply 124 (e.g., from a liquid hydrogen tank (not shown)), which provides a supply of liquid hydrogen to the vaporizers for vaporizing the liquid hydrogen to a gaseous form. The hydrogen may then flow to a hydrogen gas supply 122 for providing gaseous hydrogen to one or more fuel cells through a gaseous hydrogen supply line 129. The liquid hydrogen supply 124 may provide liquid hydrogen to the vaporizer(s) via a hydrogen pump 125 and a liquid hydrogen supply line 127. The hydrogen supply system 121 may include a secondary vaporizer hydrogen isolation valve 131 for isolating the flow of liquid hydrogen to the secondary vaporizer 126 from the liquid hydrogen supply 124. The system 100 may further include a temperature sensor 138 for sensing an ambient temperature.

In some embodiments, the vaporizers 102, 126 and the radiator 108 may be aligned vertically, and the spray supply system 114 may be configured to spray condensate in an area in vertical alignment with one or more of the vaporizers 102, 126 and the radiator 108. In some embodiments, the vaporizers 102, 126 and the radiator 108 may be vertically aligned in series.

The primary vaporizer 102 and the secondary vaporizer may 126 may be devices that heat and evaporate a working fluid (i.e., liquid hydrogen from liquid hydrogen supply 124). The primary vaporizer 102 and/or the secondary vaporizer 126 may include one or more fins 135 and/or one or more baffles 136 (FIG. 3A) for exchanging heat with the vaporizer surroundings. The vaporizers 102, 126 may generally operate at or near atmospheric pressure. The vaporizers 102, 126 may be shell and tube heat exchangers or another type of heat exchanger with one or more passes of the working fluid. The vaporizers may use the ambient temperature as a heat source or another source of heat. In some embodiments, the vaporizers 102, 126 may be configured to receive forced air from the fan system 134, which may increase the air circulating across the secondary vaporizer 126 from the environment. Both systems of fans 106, 134 may be configured such that they take in air from the cooling space 132 and force air over the vaporizers 102, 126 pulling cool air over the radiator 108 along with moisture from the spray supply system 114 with the forced air. The forced, humid air may cool the radiator 108, absorbing heat from the hydrogen fuel cell and using the heat to vaporize the liquid hydrogen in the vaporizers 102, 126 as explained in greater detail herein.

Figure 2:
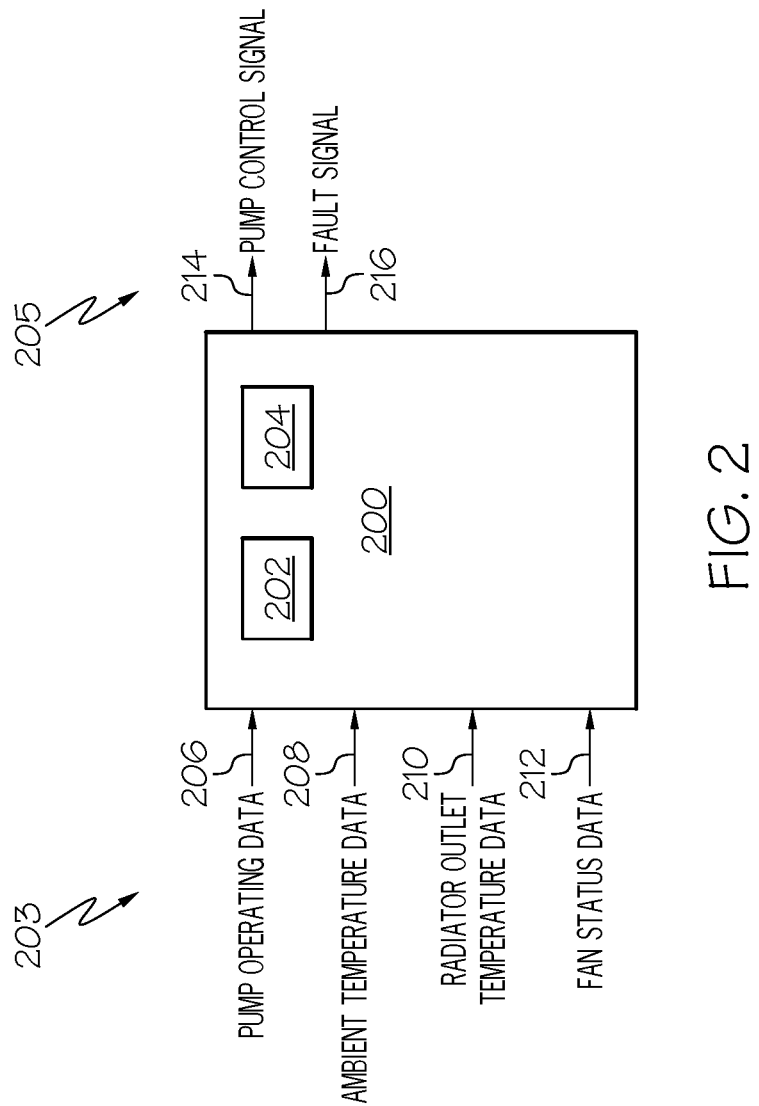
FIG. 2 is a controller of the system of FIG. 1.

Referring to FIG. 2, the system 100 may include a controller 200 that may control operation of one or more system components. The controller 200 may include a processing device 202 and a memory 204. The controller 200 may receive input data 203, which data may include, among other things, pump operating data 206 indicative of whether or not the pump 120 is in an operating status, ambient temperature data 208 from the ambient temperature sensor 138, radiator outlet temperature data 210 from the supply side temperature sensor 113, and fan status data 212 indicative of the operating status (e.g., speed) of the one or more fans 106 and/or the fans 134. The controller 200 may generate output data 205 including, among other things, a pump control signal 214 for controlling the operation of pump 120 (e.g. on, off, or amount of delivery), and a fault signal 216 corresponding to a fault condition of the pump 120.

The controller 200 may be an electronic control module (ECM) and may be communicatively coupled to or otherwise include one or more modules or systems for carrying out one or more functions of the system 100 based on the input data 203. The controller 200 may include a single processor or multiple processors configured to receive inputs, display outputs, and generate commands to control the operation of components of the system 100.

The memory 204 may include a memory, a secondary storage device, networking interfaces, or any other means for accomplishing tasks consistent with the present disclosure. The memory or secondary storage device associated with controller 200 may store data and software to allow the controller 200 to perform its functions, including the functions described below. The memory 204 may store, for example, one or more predefined values to which an ambient temperature may be compared when performing one or more functions of the system, as described in greater detail herein. One or more of the devices or systems communicatively coupled to the controller 200 may be communicatively coupled over a wired or wireless network, such as the Internet, a Local Area Network, WiFi, Bluetooth, or any combination of suitable networking arrangements and protocols.

Figure 3A:
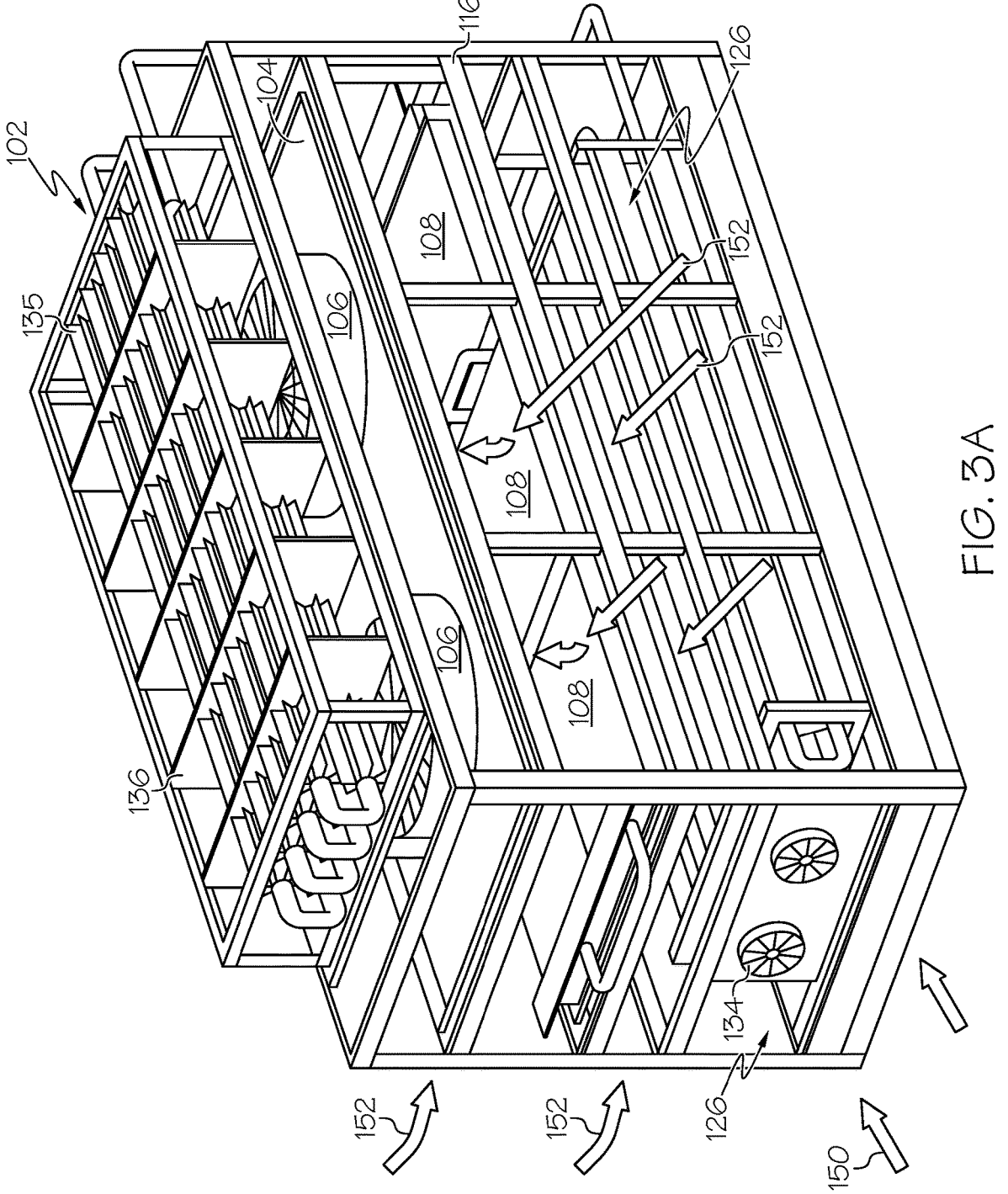
FIG. 3A is a first partial structural view of an embodiment of the system of FIG. 1.
Figure 3B:
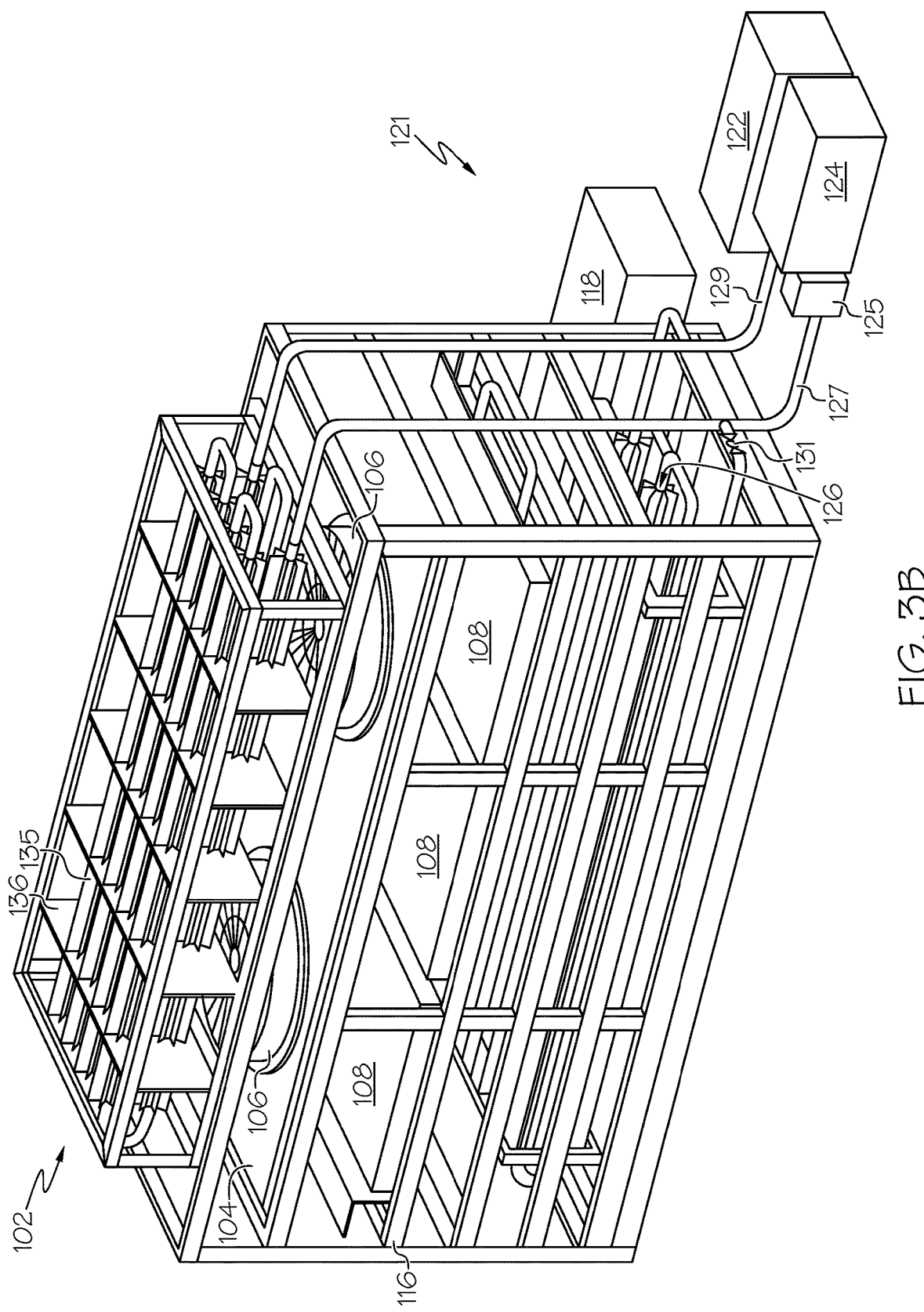
FIG. 3B is a second partial structural view of the embodiment of the system of FIG. 1.
Figure 4:
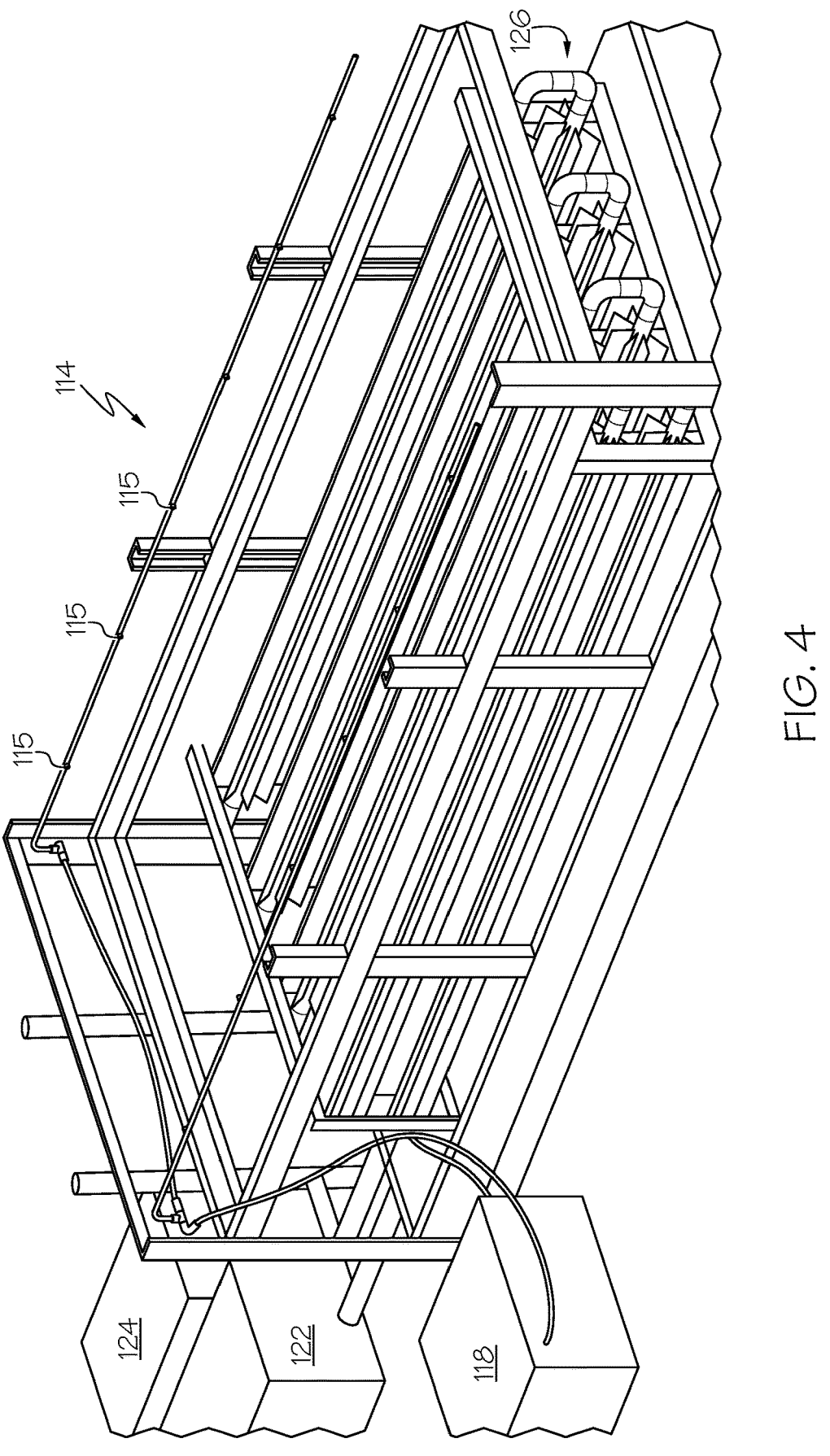
FIG. 4 is a third partial structural view of the embodiment of the system of FIG. 1 shown in FIGS. 3A and 3B with portions of the embodiment removed for greater clarity.

FIGS. 3A, 3B, and 4 show an exemplary structural configuration of the system of FIG. 1. In some embodiments, the system 100 may include walls surrounding the various components, but the system 100 in FIGS. 3A, 3B, and 4 has the walls removed for clarity. Additionally, in the embodiment depicted in FIG. 3A, the condensate tray 116 is depicted beneath the radiator 108, as opposed to beneath the secondary condenser 126. As best shown in FIG. 3B, the hydrogen supply system 121 may include the liquid hydrogen supply 124, which may provide liquid hydrogen to the vaporizer via a hydrogen pump 125 and the liquid hydrogen supply line 127. The liquid hydrogen may be vaporized in the primary vaporizer 102 and, in aspects including a secondary vaporizer, the secondary vaporizer 126. The vaporized hydrogen may then be supplied to hydrogen fuel cells via the hydrogen gas supply line 129 and the hydrogen gas supply 122.

In order to vaporize the hydrogen in the vaporizers 102, 126 using the vaporizing circuit 101, the system 100 may use convection via the heat of ambient air. As best shown in FIG. 3A, the system includes the fans 106 (which may be mounted in the fan mounting plate 104), which fans draw ambient air 152 from the surrounding environment over both of the primary vaporizer 102 and the secondary vaporizer 126. The fan system 134 may be configured to force air 150 over the secondary vaporizer 126 to evaporate the liquid hydrogen in the secondary vaporizer 126. Not all embodiments of the system 100 include a secondary vaporizer, but in aspects that do include a secondary vaporizer, the secondary vaporizer may be isolable from the hydrogen supply.

For example, some embodiments may include a secondary vaporizer liquid hydrogen isolation valve 131 for isolating the flow of liquid hydrogen to the vaporizer.

FIG. 4 shows the spray supply system 114 including the spray nozzles 115 and the water tank 118. The spray nozzles 115 may be configured to spray water from the water tank 118 into a space above the secondary vaporizer 126 and below the fans 106, which are not shown in FIG. 4 for clarity. The spray supply system 114 includes the water pump 120 (FIG. 1), which may be located in the water tank 118.

INDUSTRIAL APPLICABILITY

The system 100 of the present disclosure may be used to simultaneously cool hydrogen fuel cell cooling fluid while vaporizing liquid hydrogen for providing to a fuel cell (e.g., a proton-exchange membrane fuel cell (PEMFC)).

Referring back to FIG. 1, the primary vaporizer 102 and the secondary vaporizer 126 may receive liquid hydrogen from the liquid hydrogen supply 124 via the hydrogen pump 125 and a liquid hydrogen supply line 127 and may vaporize the hydrogen in order to provide gaseous hydrogen to a fuel cell stack (not shown) with the hydrogen gas supply 122 through a hydrogen gas supply line 129. The liquid hydrogen supply 124 may include a tank storing the hydrogen at an appropriate temperature and pressure to maintain the hydrogen in a liquid form (e.g., −423 deg. F. at 14.7 psi). The hydrogen gas supply 122 may supply gaseous hydrogen to, for example, a fuel cell stack for powering a server farm or other system, which system may generate a heat load requiring cooling by the radiator 108. In some embodiments, the fuel cell stack may power a vehicle (e.g., a large hauling truck). The vaporizers 102, 126 may add heat to the liquid hydrogen, changing the phase of the hydrogen from liquid to gas. In some aspects, the vaporizers 102, 126 may operate at a temperature that is lower than the temperature of the ambient environment due to the vaporization of the hydrogen in their tubes, and this temperature may be conducive to condensing liquid from the atmosphere. The system 100 may be configured to capture the liquid that condenses on one or more of the vaporizers 102, 126.

The system 100 may capture the liquid condensed by the vaporizer in the condensate tray 116. The condensate tray 116 can be of any suitable shape and size for collecting condensate generated by the vaporizers 102, 126. In some embodiments, the condensate tray 116 may be a generally rectangular structure surrounding the vaporizer 102 and/or the vaporizer 126 (i.e., the system 100 may include more than one condensate tray 116) and may have one or more sections, capable of holding water at one or more levels. Condensate may condense on the vaporizers 102, 126 and my drip by the force of gravity to the condensate tray 116, where it is collected (e.g., in a pool by the force of gravity) and drains to the tank 118. The condensate tray 116 may be coated with one or more hydrophobic coatings.

The condensate tray 116 may provide water to the tank 118. The tank 118 may be configured with a means for providing water to the spray supply system 114, such as, for example, the pump 120. The pump 120 can be of any suitable design (e.g., positive-displacement, centrifugal and axial-flow pumps, etc.) for providing sufficient pump head to force the condensed water from the tank 118 to the spray supply system 114 and may take a suction on the water in the water tank 118 when there is sufficient level in the water tank 118. The spray supply system 114 can have any number of spray nozzles or other outlets for spraying the water into a cooling space 132. The cooling space may generally be arranged such that fluid flowing through the cooling space 132 travels over the radiator 108 cooling the fluid passing through the radiator and ultimately providing an indirect cooling effect to the hydrogen fuel cell stack (not shown).

Figure 5:
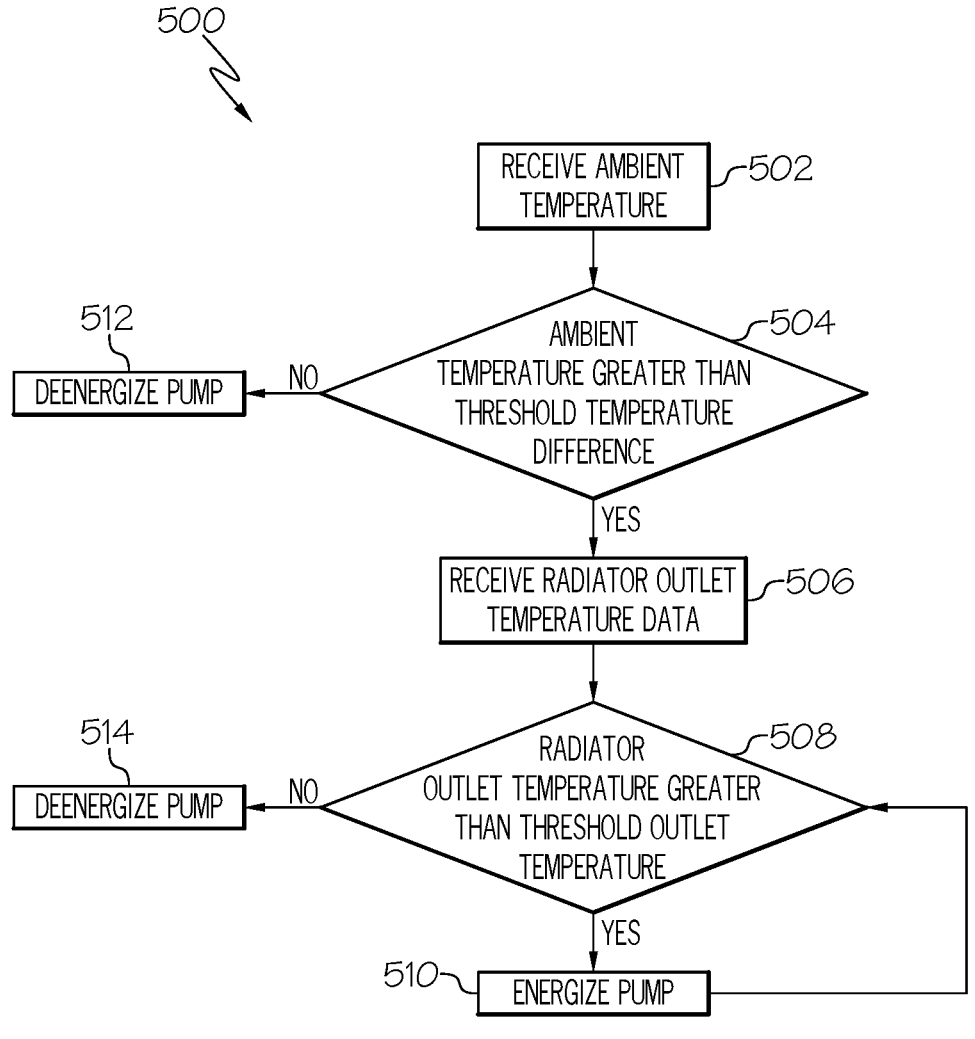
FIG. 5 is a method for using the system of FIGS. 1-4.

The functions of the system 100 of FIGS. 1-4 will now be described with respect to the method 500 shown in FIG. 5. While the method 500 includes steps 502-514, it is to be understood that the method is not limited thereto and that more or fewer steps may be included in such a method without departing from the scope of the claims appended hereto.

At step 502, the system 100 may determine an ambient air temperature based on, for example, the ambient temperature data 208 from the ambient temperature sensor 138. The system may determine an ambient temperature because, in order for any spray cooling from spray supply system 114 to have an effect, it may be necessary for there to be a certain temperature differential between the air including the spray from the spray nozzles 115 and air without it. If there is not a sufficient temperature differential, running the water pump 120 to spray the air forced over the radiator will not make the system more efficient and hence would not be desirable. At step 504, the system determines whether the ambient temperature is greater than a threshold temperature difference (i.e., a difference between the ambient temperature and a stored temperature value from a range of stored temperature values) based on the temperature received at step 502. In some embodiments, the stored temperature value used to calculate the temperature difference may depend, at least in part, on the status of one or more of the fans 106, 134 (i.e., at what speed they are running as determined by, for example, the fan status data 212). That is, if the fans 106, 134 are activated and running at a given speed, the temperature difference used to activate or deactivate the pump 120 may have a given threshold value and if the fans are running at a different speed, the temperature difference used to activate or deactivate the pump 120 may have a different threshold value. If the difference between the ambient temperature and the temperature that would be generated if spray were used is not sufficiently large (i.e., above a threshold temperature difference) the system will stop the pump or leave the pump stop at step 512 to avoid increasing an overall energy draw of the system with the pump and making the system less efficient. If, however, the ambient temperature difference is sufficient, the system may go on to determine a radiator temperature at an outlet (i.e., fuel cell supply 112 side in FIG. 1) of the radiator 108. This temperature may come from, for example, the temperature sensor 113 and may be received as radiator outlet temperature data 210 at step 506.

Based on the temperature at step 506, the system may determine whether or not to start the pump based on the determination at step 508. If the radiator outlet temperature is greater than a threshold outlet temperature at step 508 (for example, 60 degrees Celsius), the system may energize the pump 120 at step 510. The threshold outlet temperature used at step 508 may be selected from various values stored in the memory 204 and can depend on various factors. For example, the status of the fans 106, 134 as determined by fan status data 212. Energizing the pump 120 may cause the water collected in the water tank 118 to be sprayed through the spray supply system 114 through the spray nozzles 115. The spray may cause a cooling effect in the cooling space 132 which may cool the radiator 108 and reduce the temperature in the cooling fluid leaving the radiator 108 for the hydrogen fuel cells, thus cooling the hydrogen fuel cells and increasing the efficiency with which the fuel cells produce electricity. As the radiator 108 is cooled and the temperature on the fuel cell supply 112 side drops, the supply temperature may drop below the threshold value and at step 514, the system may deenergize the pump 120. In some embodiments, the system may deenergize the pump 120 based on a fault signal, as well.

Additionally, in some embodiments, the system 100 may be configured to determine one or more fault signals (e.g., based on a fault of the pump 120) after receipt of which the system 100 may secure the pump 120.

An additional attribute of the system is that, as humid air is forced over the radiator and warmed by the radiator, it will generally exhibit a temperature difference with the primary vaporizer 102. Because the primary vaporizer 102 vaporizes liquid nitrogen and operates at temperatures substantially below the ambient environment temperature, the humidity in the air flowing over the radiator and then over the vaporizer 126 will condense on the vaporizer, causing water droplets to form and drop from the vaporizer 126 by the force of gravity. In the described system, these condensed droplets are recaptured by the fan mounting plate 104 and/or the condensate tray 116. The fan mounting plate 104 and/or the condensate tray 116 may be fluidly coupled with the water tank 118 and/or one another to provide condensate to the water tank 118 as a constantly replenishing supply of water for the cooling system. In some embodiments, on sufficiently humid days with sufficient temperature difference between the ambient temperature and the vaporizer temperature, humidity in the air may simply coalesce on the vaporizer without the spraying of water through the spray supply system 114, and the system may thus have an overall surplus of water as the ambient droplets are captured through the fan mounting plate 104 and/or the condensate tray 116 and returned to the water tank 118. In some embodiments, the secondary vaporizer 126 may also be configured to supply water to the water tank 118.

It should now be understood that a system for vaporizing a working fluid may collect moisture condensed from the atmosphere based on such vaporization for reuse within the system. The condensed liquid can be captured in a fan mounting plate and/or a condensate tray and recirculated into the suction of a fan, where it may be used to cool a radiator used to remove heat from a stack of hydrogen fuel cells. A temperature of coolant at an outlet of the radiator may be monitored to determine the optimal times for energizing and stopping a pump, thus affecting an optimization of the process of cooling the radiator and evaporating the working fluid in the vaporizer simultaneously. Such processes may be particularly useful in dry climates with a high differential between a temperature of the environment and the temperature of the cooling fluid leaving the radiator. Such climates may also tend to display low relative humidity such that condensate spray will have a significant cooling effect. The systems and processes described herein may also be advantageous as they may reduce an overall power requirement for operating cooling fans at high ambient temperatures and may require less water consumption from external sources of water, as they condense and collect water from the environment. Moreover, the systems and processes may provide for a more compact design due to a smaller requirement for radiators due to increased cooling.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for vaporizing hydrogen for providing hydrogen in gaseous form to a plurality of hydrogen fuel cells comprising:
  a vaporizer;
  a radiator configured to cool a cooling fluid in a coolant system of the plurality of hydrogen fuel cells;
  a spray supply system comprising:
    a tank;
    a pump configured to pump water from the tank;
    a nozzle system; and
    a condensate tray configured to collect condensate and return the condensate to the tank, wherein
  the system is configured to activate the pump to pump the condensate collected in the tank to cool the radiator based on a temperature of the cooling fluid.

2. The system of claim 1, further comprising a fan, the fan configured to force air over the radiator and the vaporizer in series.

3. The system of claim 2, wherein the vaporizer and the radiator, are aligned vertically, and the spray supply system is configured to spray condensate in an area in vertical alignment with the vaporizer and the radiator.

4. The system of claim 3, wherein the condensate is sprayed beneath the radiator such that air blown by the fan carries the sprayed condensate over the radiator cooling the radiator.

5. The system of claim 1, wherein the vaporizer is configured to vaporize liquid hydrogen from a liquid hydrogen tank.

6. The system of claim 5, further comprising a second vaporizer configured to vaporize liquid hydrogen from the liquid hydrogen tank.

7. The system of claim 6, wherein the second vaporizer is aligned vertically below the vaporizer.

8. The system of claim 1, wherein the system is further configured to activate the pump to spray the condensate collected in the tank based on a temperature in an ambient environment.

9. The system of claim 2, wherein the fan is mounted in a fan mounting plate and the fan mounting plate is configured to collect condensate falling from the vaporizer and to deliver the collected condensate from the vaporizer to the condensate tray.

10. The system of claim 1, wherein the vaporizer further comprises a plurality of baffles to capture moisture.

11. A system for cooling of a radiator of a hydrogen fuel cell stack comprising:
  a vaporizer;
  a radiator configured to cool a cooling fluid in a coolant system of the hydrogen fuel cell stack;
  a spray supply system comprising:
    a tank;
    a pump configured to pump water from the tank;
    a nozzle system; and
    a condensate tray configured to collect condensate and return the condensate to the tank; and
  a controller, the controller comprising a processor and a memory storing one or more processor readable instructions that cause the system to:
    activate the pump to spray the condensate collected in the tank to cool the radiator based on a temperature of the cooling fluid.

12. The system of claim 11, further comprising a fan, the fan configured to draw air over the radiator and force the air over the vaporizer.

13. The system of claim 12, wherein the vaporizer and the radiator, are aligned vertically, and the spray supply system is configured to spray condensate in an area in vertical alignment with the vaporizer and the radiator.

14. The system of claim 11, wherein the vaporizer is configured to vaporize liquid hydrogen from a liquid hydrogen tank.

15. The system of claim 14, wherein the vaporizer is a first vaporizer and the system further includes a second vaporizer configured to vaporize liquid hydrogen from the liquid hydrogen tank.

16. The system of claim 15, wherein the second vaporizer is vertically below the first vaporizer and the radiator.

17. The system of claim 16, wherein the nozzle system includes a plurality of spray nozzles configured to spray condensate such that forced air carries the sprayed condensate over the radiator and the vaporizer.

18. A method of cooling of a fuel cell stack radiator comprising:

measuring an ambient temperature and determining a temperature difference between the ambient temperature and a stored temperature value;

measuring a temperature of a cooling fluid at an outlet of a radiator of a fuel cell stack;

activating a pump to provide condensate spray through a nozzle system based on the measured temperature being above a threshold value, wherein the pump is configured to pump liquid from a tank that has been collected as condensate from a vaporizer configured to evaporate liquid hydrogen to provide hydrogen gas to the fuel cell stack.

19. The method of claim 18, wherein the nozzle system is configured to spray condensate at an inlet of air of a fan configured to force the air over the vaporizer.

20. The method of claim 19, wherein the fan is mounted in a fan mounting plate that is fluidly coupled with a condensate tray, which condensate tray is fluidly coupled with the tank.

\* \* \* \* \*